US010115948B2

(12) United States Patent
Nishikawa et al.

(10) Patent No.: US 10,115,948 B2
(45) Date of Patent: *Oct. 30, 2018

(54) SEPARATOR FOR A NON-AQUEOUS SECONDARY BATTERY AND NON-AQUEOUS SECONDARY BATTERY

(71) Applicant: TEIJIN LIMITED, Osaka-shi, Osaka (JP)

(72) Inventors: Satoshi Nishikawa, Iwakuni (JP); Takashi Yoshitomi, Iwakuni (JP); Atsuhiro Otsuka, Iwakuni (JP); Ayumi Iwai, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/352,851

(22) PCT Filed: Oct. 19, 2012

(86) PCT No.: PCT/JP2012/077134
§ 371 (c)(1),
(2) Date: Apr. 18, 2014

(87) PCT Pub. No.: WO2013/058370
PCT Pub. Date: Apr. 25, 2013

(65) Prior Publication Data
US 2014/0255754 A1  Sep. 11, 2014

(30) Foreign Application Priority Data
Oct. 21, 2011  (JP) .................................. 2011-231836

(51) Int. Cl.
*H01M 2/16* (2006.01)
*H01M 2/02* (2006.01)
*H01M 10/052* (2010.01)

(52) U.S. Cl.
CPC ......... *H01M 2/1686* (2013.01); *H01M 2/027* (2013.01); *H01M 2/1653* (2013.01); *H01M 10/052* (2013.01); *H01M 2/168* (2013.01)

(58) Field of Classification Search
CPC .. H01M 2/1686; H01M 2/027; H01M 2/1653; H01M 10/052; H01M 2/168
See application file for complete search history.

(56) References Cited

U.S. PATENT DOCUMENTS

| 5,922,493 A * | 7/1999 | Humphrey, Jr. ..... H01M 2/0275 429/175 |
| 6,225,010 B1 * | 5/2001 | Hamano et al. .............. 429/306 |
| 6,692,873 B1 * | 2/2004 | Park et al. ..................... 429/247 |
| 2001/0009736 A1 * | 7/2001 | Shiota et al. ................. 429/164 |
| 2002/0197413 A1 * | 12/2002 | Daido .................... H01M 2/145 427/430.1 |
| 2004/0053122 A1 | 3/2004 | Sugiyama et al. |
| 2006/0088762 A1 | 4/2006 | Okamoto |
| 2006/0286446 A1 | 12/2006 | Chun et al. |
| 2009/0186274 A1 * | 7/2009 | Wakita .................. H01M 4/133 429/217 |

FOREIGN PATENT DOCUMENTS

| CN | 1495936 A | 5/2004 |
| CN | 101494302 A | 7/2009 |
| JP | 2000-21233 A | 1/2000 |
| JP | 2001-76758 A | 3/2001 |
| JP | 2001-319693 A | 11/2001 |
| JP | 2002-25620 A | 1/2002 |
| JP | 2003-7280 A | 1/2003 |
| JP | 2003-178804 A | 6/2003 |
| JP | 2004-111160 A | 4/2004 |
| JP | 2006-120462 A | 5/2006 |
| JP | 4109522 B2 | 7/2008 |
| JP | 4127989 B2 | 7/2008 |
| JP | 4414165 B2 | 2/2010 |
| JP | 4490055 B2 | 6/2010 |
| JP | 2012221741 A * | 11/2012 |
| WO | 2004/112183 A1 | 12/2004 |

OTHER PUBLICATIONS

Chinese Office Action dated Sep. 18, 2015, for Application No. 201280051157.6, 12 pages.

* cited by examiner

*Primary Examiner* — Gregg Cantelmo
(74) *Attorney, Agent, or Firm* — Sughrue Mion, PLLC

(57) ABSTRACT

The present invention provides a separator for a non-aqueous secondary battery including a porous substrate, and an adhesive porous layer that is formed at one or both sides of the porous substrate, that contains polyvinylidene fluoride resin A and polyvinylidene fluoride resin B, and that has a porosity of from 30% to 60% and an average pore size of from 20 nm to 100 nm.

7 Claims, No Drawings

SEPARATOR FOR A NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2012/077134 filed Oct. 19, 2012 (claiming priority based on Japanese Patent Application No. 2011-231836 filed Oct. 21, 2011), the contents of which are incorporated herein by reference in their entirety.

TECHNICAL FIELD

The present invention relates to a separator for a non-aqueous secondary battery and a non-aqueous secondary battery.

BACKGROUND ART

Non-aqueous secondary batteries, such as lithium ion secondary batteries, have been widely used as power supply for portable electronic devices such as lap-top computers, mobile phones, digital cameras, and camcorders. Further, in recent years, since these batteries have high energy density, application of these batteries to automobiles and the like has also been studied.

In conjunction with reductions in size and weight of portable electronic devices, the outer casing of non-aqueous secondary batteries has been simplified. Recently, as the outer casing, a battery can made of an aluminum can has been developed in place of the battery can made of stainless steel that was previously used, and further, currently, a soft pack outer casing made of an aluminum laminate pack has also been developed.

In the case of a soft pack outer casing made of aluminum laminate, since the outer casing is soft, a space may form between an electrode and a separator in conjunction with charging and discharging. This is one of factors contributing to deterioration of the cycle life, and therefore, uniform retention of the adhesive property of adhered portions of electrodes, separators, or the like, is a significant technical problem.

As techniques relating to the adhesive property, various techniques for enhancing the adhesion between an electrode and a separator have been proposed. As one of such techniques, a technique of using a separator in which a porous layer (hereinafter also referred to as an "adhesive porous layer") using a polyvinylidene fluoride resin is formed on a polyolefin microporous membrane, a conventional separator, has been proposed (see, for example, Patent Documents 1 to 4). The adhesive porous layer functions as an adhesive that favorably joins the electrode and the separator together, in a case in which an adhesive porous layer and an electrode is disposed adjacently in layers and subjected to compression bonding or heat pressing. Accordingly, the adhesive porous layer contributes to improvement of the cycle life of a soft pack battery.

In a separator having a polyolefin microporous membrane and an adhesive porous layer formed thereon as described above, from the viewpoint of achieving both ion permeability and ensuring sufficient adhesive property, a new technical proposal focusing upon the porous structure and thickness of a polyvinylidene fluoride resin layer, and a new technical proposal that uses two kinds of polyvinylidene fluoride resins in combination, have been made.

Further, in the case of producing a battery using a conventional metal can outer casing, electrodes and a separator are disposed adjacently in layers and wound to produce a battery element, and this element is enclosed in a metal can outer casing together with an electrolyte, thereby producing a battery. Meanwhile, in the case of producing a soft pack battery using a separator having the adhesive porous layer described above, a battery element is produced in a manner similar to that in the production of a battery having a metal can outer casing as described above, after which this battery element is enclosed in a soft pack outer casing together with an electrolyte, and thereafter, is finally subjected to a heat pressing process, thereby producing a battery. Accordingly, in the case of using such a separator, a battery element can be produced in a manner similar to that in the production of a battery having a metal can outer casing as described above. This is advantageous in that it is not necessary to greatly change the production process from that for conventional batteries having a metal can outer casing.

Patent Document 1: Japanese Patent No. 4127989
Patent Document 2: Japanese Patent No. 4490055
Patent Document 3: Japanese Patent No. 4109522
Patent Document 4: Japanese Patent No. 4414165

DISCLOSURE OF THE INVENTION

Problem to be Solved by the Invention

In general, the positive electrode or negative electrode in a non-aqueous secondary battery includes a current collector and an active substance layer that is formed on the current collector and contains an electrode active substance and a binder resin. In a case in which an adhesive porous layer is joined to the electrode by heat pressing, the adhesive porous layer adheres to the binder resin in the electrode. Therefore, in order to ensure a more favorable adhesive property, a higher amount of binder resin in the electrode is preferable.

However, in order to further increase the energy density of a battery, it is necessary to increase the content of the active substance in the electrode, and therefore, a lower content of binder resin is preferable. Therefore, according to the prior art, in order to ensure sufficient adhesive property, it has been necessary to perform heat pressing under severe conditions such as higher temperatures or higher pressures. Further, according to the prior art, in a case in which heat pressing is performed under such severe conditions, there is a problem in that the porous structure of the adhesive porous layer formed from a polyvinylidene fluoride resin is destroyed. As a result, ion permeability becomes insufficient after the heat pressing process, and it has been difficult to obtain favorable battery characteristics.

For example, in the configuration of Patent Document 1, the porosity of the porous layer formed from a polyvinylidene fluoride resin is extremely high and is as high as 50% to 90%. However, such a configuration has a problem in that dynamic physical properties are insufficient against severe adhesion conditions in an adhesion process as described above. In addition, in the configuration, the surface structure is such that the surface is studded with pores having a pore size of from 0.05 μm to 10 μm. However, in the present circumstances, with such an ununiform surface structure, it has become difficult to make the adhesion to electrodes, the ion permeability, and the cycle characteristics of a battery be compatible.

Further, in the configurations of Patent Document 2 to Patent Document 4, the adhesive porous layer has a so-called fingerskin structure, in which the surface of the adhesive porous layer is a dense membrane having an average pore size of from 0.1 μm to 5 μm, and inside the same layer, coarse pores having a larger pore size, such as those having an average pore size of from 0.5 μm to 10 μm, are formed. In the case of this structure, since the surface of the adhesive porous layer is dense, adhesion to electrodes can be ensured, but ion migration at the surface part is difficult. In addition, since the fingerskin structure is an ununiform pore structure as the whole porous layer, ion migration is also ununiform, and there are cases in which the performance of a battery is not sufficiently obtained.

In view of such a background, in the present invention, a separator for a non-aqueous secondary battery has been required, which exhibits excellent adhesion to electrodes and excellent ion permeability even after adhesion to electrodes, as compared with conventional separators, and is provided with an adhesive porous layer that has dynamic physical properties sufficient to withstand compression bonding and also heat pressing, and has a uniform porous structure.

Further, a high-energy density, high-performance non-aqueous secondary battery having an aluminum laminate pack outer casing has been required.

Means for Solving the Problem

In order to address the problems described above, the invention is configured as follows.

<1> A separator for a non-aqueous secondary battery, including a porous substrate, and an adhesive porous layer that is formed at one side or both sides of the porous substrate, contains (1) the following polyvinylidene fluoride resin A and (2) the following polyvinylidene fluoride resin B, and has a porosity of from 30% to 60% and an average pore size of from 20 nm to 100 nm:

(1) polyvinylidene fluoride resin A selected from the group consisting of vinylidene fluoride homopolymers, and vinylidene fluoride copolymers containing structural units derived from vinylidene fluoride and structural units derived from hexafluoropropylene, a total content of structural unit derived from hexafluoropropylene in each of the vinylidene fluoride copolymers being 1.5 mol % or less of a total content of structural unit in each of the vinylidene fluoride copolymers; and (2) polyvinylidene fluoride resin B selected from the group consisting of vinylidene fluoride copolymers containing a structural unit derived from vinylidene fluoride and a structural unit derived from hexafluoropropylene, a total content of structural unit derived from hexafluoropropylene in each of the vinylidene fluoride copolymers being greater than 1.5 mol % of a total content of structural unit in each of the vinylidene fluoride copolymers.

Hereinafter, the vinylidene fluoride homopolymer is also referred to as simply "resin A1".

Further, the vinylidene fluoride copolymer containing structural units derived from vinylidene fluoride and structural units derived from hexafluoropropylene, a total content of structural unit derived from hexafluoropropylene in each of the vinylidene fluoride copolymers being 1.5 mol % or less of a total content of structural units in each of the vinylidene fluoride copolymers, is also referred to as simply "resin A2".

Moreover, the vinylidene fluoride copolymer containing structural units derived from vinylidene fluoride and structural units derived from hexafluoropropylene, a total content of structural unit derived from hexafluoropropylene in each of the vinylidene fluoride copolymers being greater than 1.5 mol % of a total content of structural unit in each of the vinylidene fluoride copolymers, is also referred to as simply "resin B".

Namely, the adhesive porous layer included in the separator for a non-aqueous secondary battery of the invention is configured to include at least resin A1 and resin B, or is configured to include at least resin A2 and resin B.

<2> The separator for a non-aqueous secondary battery as described in the above <1>, wherein the adhesive porous layer has an average pore size of from 20 nm to 70 nm.

<3> The separator for a non-aqueous secondary battery as described in the above <1> or <2>, wherein, in the adhesive porous layer, a content of the polyvinylidene fluoride resin A is from 15 parts by mass to 85 parts by mass, and a content of the polyvinylidene fluoride resin B is from 85 parts by mass to 15 parts by mass, when a total amount of the polyvinylidene fluoride resin A and the polyvinylidene fluoride resin B is taken as 100 parts by mass.

<4> The separator for a non-aqueous secondary battery as described in any one of the above <1> to <3>, wherein an amount per unit area of the adhesive porous layer at one side of the porous substrate is from 0.5 g/m$^2$ to 1.5 g/m$^2$.

<5> A non-aqueous secondary battery comprising a positive electrode, a negative electrode, and the separator for a non-aqueous secondary battery as described in any one of the above <1> to <4>, the separator being disposed between the positive electrode and the negative electrode, wherein, in the non-aqueous secondary battery, electromotive force is obtained by lithium doping/dedoping.

<6> The non-aqueous secondary battery according to <5>, further comprising an outer casing made from an aluminum laminate film, wherein the positive electrode, the negative electrode, and the separator for a non-aqueous secondary battery are housed in the outer casing.

Effect of the Invention

According to the invention, a separator for a non-aqueous secondary battery, which exhibits excellent adhesion to electrodes and excellent ion permeability even after adhesion to electrodes, as compared with conventional separators, and is provided with an adhesive porous layer that has dynamic physical properties sufficient to withstand compression bonding and also heat pressing, and has a uniform porous structure, may be provided. By the use of such a separator for a non-aqueous secondary battery of the invention, a non-aqueous secondary battery with an aluminum laminate pack outer casing, which has a high-energy density and high-performance, may be provided.

BEST MODE FOR CARRYING OUT THE INVENTION

<Separator for a Non-aqueous Secondary Battery>

The separator for a non-aqueous secondary battery (hereinafter also referred to as "separator") of the invention includes a porous substrate and an adhesive porous layer that is provided on one side or both sides of the porous substrate, contains (1) resin A1 or resin A2 and (2) resin B, and has a porosity of from 30% to 60% and an average pore size of from 20 nm to 100 nm.

Here, the resin A1 is a vinylidene fluoride homopolymer including only structural units derived from vinylidene fluoride (VdF). Hereinafter, the vinylidene fluoride homopolymer is also referred to as "VdF resin".

The resin A2 is a vinylidene fluoride copolymer containing structural units derived from vinylidene fluoride (VdF)

and structural units derived from hexafluoropropylene (HFP). However, in the resin A2, the ratio of structural units derived from hexafluoropropylene (HFP) to all structural units is 1.5 mol % or less.

Hereinafter, the vinylidene fluoride copolymer containing structural units derived from vinylidene fluoride (VdF) and structural units derived from hexafluoropropylene (HFP) is also referred to as "VdF-HFP resin".

The resin B is also a vinylidene fluoride copolymer (VdF-HFP resin) containing structural units derived from vinylidene fluoride (VdF) and structural units derived from hexafluoropropylene (HFP). However, in the resin B, the ratio of structural units derived from hexafluoropropylene to all structural units is greater than 1.5 mol %.

By including (1) resin A1 or resin A2, and (2) resin B, as a polyvinylidene fluoride resin (PVdF resin), the adhesive porous layer in the invention exhibits excellent adhesion between the separator and electrodes, as compared with the case of not including either one of (1) or (2). The reason for this is guessed as follows.

Polyvinylidene fluoride resin (VdF-HFP resin) that contain structural units derived from vinylidene fluoride and structural units derived from hexafluoropropylene are prone to swell with an electrolyte, as the ratio of structural units derived from HFP is increased. Therefore, there is high possibility that the adhesion between the adhesive porous layer and electrodes is improved, when the resin B having a ratio of structural units derived from HFP of greater than 1.5 mol % is used as the constituent material of the adhesive porous layer. However, in a case in which only the resin B is used as the constituent material of the adhesive porous layer, the adhesion between the separator and electrodes is not always high, and rather, the adhesive property tends to be lowered, when the ratio of structural units derived from HFP is increased.

Here, the adhesive porous layer that exists at the surface of the separator is a layer that bonds to an electrode.

A portion that contains a polyvinylidene fluoride resin having a function of adhesion and pore portions are present in the surface of the adhesive porous layer. In a case in which an adhesive porous layer is formed by using only the resin B having a high ratio of structural units derived from HFP, a morphology with a high porosity and a large pore size is easily obtained.

When the adhesive porous layer has a porous structure with a high porosity and a large pore size, the area of the polyvinylidene fluoride resin portion is reduced, and the points of adhesion to an electrode are sparsely distributed. It is thought that this is the reason why a sufficient function of adhesion to electrodes cannot be obtained by using only the resin B.

On the contrary, in a case in which only a VdF resin that does not contain a structural unit derived from HFP, as the resin A1, or a VdF-HFP resin that has a low ratio of structural units derived from HFP, as the resin A2 is used, a porous structure with a low porosity and a small pore size, in such a degree that the ion permeability is not inhibited, can be obtained.

It is also thought that, with such a porous structure, the adhesion between the electrodes and the separator may be improved, from the viewpoint of surface morphology.

However, in this case, since the ratio of structural units derived from HFP is low, the resin has inferior swelling property with respect to an electrolyte, and thus it is difficult that the separator attains a high adhesion to electrodes.

In the invention, the adhesive porous layer contains the resin B, that has a high HFP ratio such that the ratio of structural units derived from HFP to all structural units in the molecule is greater than 1.5 mol %, and thus, the swelling property of a separator with respect to an electrolyte can be ensured. Further, the adhesive porous layer further contains the resin A2 that has a low HFP ratio such that the ratio of structural units derived from HFP to all structural units in the molecule is 1.5 mol % or less, or the resin A1 that does not contain a structural unit derived from HFP, and thus, it is possible to obtain a surface morphology suitable for adhesion between the separator and electrodes.

For such a reason, when the resin A1 or resin A2 and the resin B are used in mixture, as the constituent material of the adhesive porous layer, a synergistic effect on adhesion between the separator and electrodes is generated, and thus it is possible to significantly improve the adhesive property.

Accordingly, the separator of the invention has excellent adhesion to electrodes even by heat pressing under mild heating conditions or by pressing without heating.

Moreover, in the invention, it is necessary that the resin A2 contains the structural units derived from HFP in a ratio of less than or equal to 1.5 mol % relative to all structural units. When the ratio of structural units derived from HFP in the resin A2 is greater than 1.5 mol %, it is difficult to obtain a suitable surface morphology as described above, and thus a sufficient adhesion between the separator and electrodes cannot be obtained.

Note that, the adhesion between a separator and an electrode can be confirmed as a peel force determined by a separation test. Details of the separation test are described below.

Hereinafter, the invention is described in detail. Note that, hereinafter, a numerical range represented by "to" means a numerical range including the upper limit and the lower limit.

[Porous Substrate]

The porous substrate, in the invention, means a substrate having pores or voids inside.

Examples of such a substrate include a microporous membrane, a porous sheet formed from a fibrous material such as non-woven fabric or a paper-like sheet, and a composite porous sheet obtained by placing one or more other porous layers on the microporous membrane or porous sheet. Among them, a microporous membrane is particularly preferable, from the viewpoints of thinning and high strength.

Note that, A microporous membrane means a membrane having a large number of micropores inside, in which the micropores are connected to allow gas or liquid to pass therethrough from one side to the other side of the membrane.

The material that constitutes the porous substrate may be an electrical insulating organic material or an electrical insulating inorganic material. Particularly, from the viewpoint of imparting a shutdown function to the substrate, the material that constitutes the substrate is preferably a thermoplastic resin. As the thermoplastic resin, a thermoplastic resin having a melting point of lower than 200° C. is suitable, and polyolefin is particularly preferable.

The term "shutdown function" refers to the following function. Namely, in a case in which the battery temperature becomes high, the thermoplastic resin melts and blocks the pores of the porous substrate, thereby blocking the ion migration to prevent thermal runaway of the battery.

As the porous substrate using polyolefin, a polyolefin microporous membrane is preferable.

As the polyolefin microporous membrane, a polyolefin microporous membrane that has sufficient dynamic physical properties and ion permeability may be selected among the polyolefin microporous membranes that have been applied to conventional separators for a non-aqueous secondary battery.

From the viewpoint of exhibiting the shutdown function, it is preferable that the polyolefin microporous membrane contains polyethylene, and it is preferable that the content of polyethylene is 95% by mass or more.

In addition to the above, from the viewpoint of imparting heat resistance to such a degree that the membrane does not easily break when exposed to high temperatures, a polyolefin microporous membrane containing polyethylene and polypropylene is preferable. An example of such a polyolefin microporous membrane is a microporous membrane in which polyethylene and polypropylene are present as a mixture in one layer. In such a microporous membrane, it is preferable that the microporous membrane contains polyethylene in an amount of 95% by mass or more and polypropylene in an amount of 5% by mass or less, from the viewpoint of achieving both the shutdown function and heat resistance. Further, from the viewpoint of achieving both the shutdown function and heat resistance, it is also preferable that the polyolefin microporous membrane is a polyolefin microporous membrane having a multi-layer structure of two or more layers, in which at least one layer contains polyethylene and at least one layer contains polypropylene.

It is preferable that the polyolefin contained in the polyolefin microporous membrane has a weight average molecular weight of from 100,000 to 5,000,000. When the weight average molecular weight is 100,000 or more, sufficient dynamic physical properties can be ensured. Meanwhile, when the weight average molecular weight is 5,000,000 or less, the shutdown characteristics are favorable, and it is easy to form a membrane.

The polyolefin microporous membrane can be produced, for example, by the following methods. Namely, an example includes a method of forming a microporous membrane by carrying out:

(a-i) a process of extruding a molten polyolefin resin through a T-die to form a sheet,
(a-ii) a process of subjecting the sheet to a crystallization treatment,
(a-iii) a process of stretching the sheet, and
(a-iv) a process of subjecting the sheet to a heat treatment, in this order.

Further, other examples include a method of forming a microporous membrane by carrying out:

(b-i) a process of melting a polyolefin resin together with a plasticizer such as liquid paraffin or the like, and extruding the melt through a T-die, followed by cooling to form a sheet,
(b-ii) a process of stretching the sheet,
(b-iii) a process of extracting the plasticizer from the sheet, and
(b-iv) a process of subjecting the sheet to a heat treatment, in this order, and the like.

Examples of a porous sheet formed from a fibrous material include a porous sheet formed from a fibrous material such as polyester such as polyethylene terephthalate; polyolefin such as polyethylene or polypropylene; or a heat resistant polymer such as aromatic polyamide, polyimide, polyethersulfone, polysulfone, polyetherketone, or polyetherimide; and a porous sheet formed from any mixture of the above fibrous materials.

A composite porous sheet may have a configuration in which a functional layer is disposed on a microporous membrane or a porous sheet formed from a fibrous material. Such a composite porous sheet is preferable, since a further function can be imparted by the functional layer. As the functional layer, for example, from the viewpoint of imparting heat resistance, a porous layer formed from a heat resistant resin or a porous layer formed from a heat resistant resin and an inorganic filler can be adopted. Examples of the heat resistant resin include one or two or more kinds of heat resistant polymers selected from the group consisting of aromatic polyamide, polyimide, polyethersulfone, polysulfone, polyetherketone, and polyetherimide. As the inorganic filler, a metal oxide such as alumina, a metal hydroxide such as magnesium hydroxide, or the like can be used suitably.

Examples of a method of forming a composite include a method of coating a functional layer on a microporous membrane or a porous sheet, a method of joining a functional layer and a microporous membrane or a porous sheet using an adhesive, and a method of compression bonding or thermocompression bonding of a functional layer and a microporous membrane or a porous sheet.

In the invention, the thickness of the porous substrate is preferably in a range of from 5 μm to 25 μm, from the viewpoint of obtaining favorable dynamic physical properties and internal resistance.

The Gurley value (JIS P8117) of the porous substrate is preferably in a range of from 50 sec/100 cc to 800 sec/100 cc, from the viewpoints of preventing a short circuit in the battery and obtaining sufficient ion permeability.

The puncture strength of the porous substrate is preferably 300 g or more, from the viewpoint of improving the production yield.

[Adhesive Porous Layer]

The adhesive porous layer included in the separator of the invention contains (1) resin A1 or resin A2 and (2) resin B, and has a porous structure with a porosity of from 30% to 60% and an average pore size of from 20 nm to 100 nm.

The adhesive porous layer has a large number of micropores inside, and has a structure in which these micropores are connected to each other, so that the layer allows gas or liquid to pass therethrough from one side to the other side.

Further, in the invention, the adhesive porous layer is a layer that is provided on one side or both sides of the porous substrate, as the outermost layer of a separator, and can bond to an electrode.

It is more preferable that the adhesive porous layer is formed on both sides of the porous substrate than only on one side of the porous substrate, from the viewpoint of having excellent cycle characteristics of a battery. It is because, when the adhesive porous layer exists on both sides of the porous substrate, the two surfaces of the separator adhere well to the two electrodes, respectively, via the adhesive porous layer.

The average pore size of the adhesive porous layer is calculated according to the following Equation 1, assuming that all pores incorporated in the adhesive porous layer are cylindrical.

$$d = 4 \cdot V/S \qquad \text{Equation 1}$$

In Equation 1, d represents the average pore size (diameter) (nm) of the adhesive porous layer, V represents the pore volume per 1 $m^2$ of the adhesive porous layer, and S represents the pore surface area per 1 $m^2$ of the adhesive porous layer.

The pore volume V per 1 $m^2$ of the adhesive porous layer is calculated from the porosity of the adhesive porous layer.

The pore surface area S per 1 $m^2$ of the adhesive porous layer is calculated by the following method.

First, the specific surface area (m²/g) of the porous substrate and the specific surface area (m²/g) of the separator are calculated from the nitrogen gas amount absorbed, by applying the BET equation to a nitrogen gas adsorption method. Then, these specific surface areas (m²/g) are each multiplied by the respective weights per unit area (g/m²) to determine the pore surface areas per 1 m². Then, the pore surface area per 1 m² of the porous substrate is subtracted from the pore surface area per 1 m² of the separator, to determine the pore surface area S per 1 m² of the adhesive porous layer.

The adhesive porous layer has a porosity of from 30% to 60% and an average pore size of from 20 nm to 100 nm.

When the porosity of the adhesive porous layer is less than 30% and the average pore size is less than 20 nm, the pores are substantially blocked, as the polyvinylidene fluoride resin is swelled by an electrolyte. Therefore, favorable ion permeability at a low temperature cannot be obtained.

When the porosity is greater than 60% and the average pore size is greater than 100 nm, the amount of electrolyte impregnated by the polyvinylidene fluoride resin becomes larger relative to the polyvinylidene fluoride resin. Therefore, it becomes difficult for the polyvinylidene fluoride resin to sufficiently keep the electrolyte. There is possibility that a battery using such a separator has a problem in that storage characteristics are deteriorated, since the battery expands due to generation of gas at the time of storage under high temperature conditions. Further, there are cases in which a sufficient adhesion between the separator and electrodes cannot be ensured when the separator is exposed to a high temperature, for the reason that the polyvinylidene fluoride resin is dissolved in the electrolyte at a high temperature. As a result, the cycle characteristics are deteriorated.

Further, when the porosity of the adhesive porous layer is 60% or less, sufficient dynamic physical properties for keeping the porous structure of the adhesive porous layer are easily obtained, in the pressing process for bonding the separator and electrodes to each other. In addition, when the porosity of the adhesive porous layer is 60% or less, the surface hole area rate of the adhesive porous layer is reduced. Therefore, the ratio of the area of the polyvinylidene fluoride resin portion relative to the area of the adhesive porous layer surface is increased. As a result, the separator is likely to ensure a sufficient adhesive strength with respect to electrodes. When the porosity of the adhesive porous layer is 30% or more, favorable ion permeability is obtained, and the battery characteristics are easily improved.

When the average pore size of the adhesive porous layer is 100 nm or less, pores may be uniformly dispersed in the surface of the adhesive porous layer. As a result, points of adhesion between the separator and an electrode may also be dispersed uniformly, whereby sufficient adhesive property may be ensured easily. Further, in this case, ion migration also tends to be uniform, and thus, sufficient cycle characteristics and load characteristics may be obtained easily.

The average pore size of the adhesive porous layer is preferably 70 nm or less.

Further, there is another case, when the average pore size is greater than 100 nm.

Specifically, there is a case in which pores are scarcely recognized in the front layer, when the adhesive porous layer is observed using an electron microscope or the like, but the average pore size is greater than 100 nm, when the average pore size of the adhesive porous layer is calculated by the measurement method described above. In this case, the adhesive porous layer has a fingerskin structure, in which a dense skin layer is formed in the front layer of the adhesive porous layer, and large pores exist inside the adhesive porous layer. For example, the techniques described in Patent Document 2 to Patent Document 4 are examples of the fingerskin structure. In the fingerskin structure, since the front layer of the adhesive porous layer is a layer which is dense and is formed from a polyvinylidene fluoride resin, adhesion between the separator and electrodes can be ensured. However, since the front layer has a dense structure, migration of ions in the front layer is difficult, and there are cases in which battery performance is not sufficient, which is thus not preferable.

When the average pore size is within the range of from 20 nm to 100 nm, in the measurement of average pore size of the adhesive porous layer by the method described above, the porous layer never has a fingerskin structure that may generate failure in battery performance.

Further, when the adhesive porous layer does not have a fingerskin structure, it is possible to suppress the occurrence of scuffing or crimp at the slit edge face, in the case of slitting the separator.

When the mechanical strength of an adhesive porous layer is small, the adhesive porous layer is too soft, so that it is difficult to cut, and scuffing or crimp occurs at the slit edge face; however, when the adhesive porous layer has a configuration according to the invention, the separator becomes hard as appropriate, so that slitting is performed easily, and scuffing or crimp hardly occurs at the slit edge face.

When the number of scuffing defects or crimps is small at the slit edge face of the separator, the adhesion between the separator and electrodes is more enhanced, and the production yield is more enhanced, which is thus preferable.

When the average pore size of the adhesive porous layer is 20 nm or more, ions move easily, and favorable battery performance is easily obtained. The details are described below.

First, in a case in which the adhesive porous layer is impregnated with an electrolyte, the polyvinylidene fluoride resin swells. Although, the degree of swelling varies depending on the constitution of the resin, in the case of a polyvinylidene fluoride resin, when the average pore size of the adhesive porous layer is 20 nm or more, it is easy to prevent the pores from being blocked due to swelling of resin, when the polyvinylidene fluoride resin is impregnated with an electrolyte. Therefore, even in the state of being swelled, pore portions for ion migration are easily ensured, and favorable battery performance is obtained easier, as compared with the case in which such pore portions are blocked. Note that, in the case in which pore portions are blocked, ions can move only inside the polyvinylidene fluoride resin that contains the electrolyte and is gelled, and thus, the ion migration becomes extremely slower, as compared with the case in which pores are not blocked.

According to the invention, an adhesive porous layer which has a porosity suitable as a separator for non-aqueous secondary batteries, and has an average pore size significantly smaller than that of a conventional adhesive porous layer may be obtained. This means that a fine porous structure is developed and the structure is uniform. Therefore, the uniformity of ion migration at the interface between the separator and the electrode is favorable. Accordingly, a uniform electrode reaction becomes possible, and improvement effects on the load characteristics and cycle characteristics of a battery may be realized. In addition, the polyvinylidene fluoride resin portion that contributes to adhesion between the separator and electrodes is highly uniformly distributed on the surface. Therefore, in the separator of the invention, with respect to electrodes, favorable adhesive property is achieved.

Further, the porous structure according to the invention also improves the ion migration at the interface between the porous substrate and the adhesive porous layer. In a laminate type separator, like the separator of the invention, generally, clogging easily occurs at the interface between the porous substrate and the adhesive porous layer. In a case in which clogging has occurred at the interface, the ion migration at the interface is easily deteriorated, and therefore, it is sometimes difficult to obtain favorable battery characteristics.

However, the adhesive porous layer according to the invention has a fine porous structure developed, and thus the pore distribution is uniform and the number of pores is large. Therefore, there is high possibility that the pores of the porous substrate and the pores of the adhesive porous layer formed by using a polyvinylidene fluoride resin are favorably connected, whereby it is possible to significantly suppress the lowering of performance due to clogging.

It is preferable that the mass per unit area of the adhesive porous layer on one side of the porous substrate is from 0.5 $g/m^2$ to 1.5 $g/m^2$. When the mass per unit area is 0.5 $g/m^2$ or more, the adhesion between the separator and electrodes is sufficient. Further, when the mass per unit area is 1.5 $g/m^2$ or less, the ion permeability of the adhesive porous layer is less likely to be inhibited, and the load characteristics of a battery is less likely to be lowered.

In a case in which the adhesive porous layer is formed on both sides of the porous substrate, the mass of the adhesive porous layer, as the total mass on both sides, is preferably from 1.0 $g/m^2$ to 3.0 $g/m^2$.

In the invention, in a case in which the adhesive porous layer is formed on both sides of the porous substrate, the difference between the mass of the adhesive porous layer on one side and the mass of the adhesive porous layer on the other side is also important.

Specifically, it is preferable that the total mass of the adhesive porous layers formed on both sides of the porous substrate is from 1.0 $g/m^2$ to 3.0 $g/m^2$, and the difference ($\Delta W$) between the mass of the adhesive porous layer on one side and the mass of the adhesive porous layer on the other side is 20% or less with respect to the total mass on both sides. When $\Delta W$ is 20% or less, the separator hardly curls and, as a result, handling property is favorable and the problem of lowering of cycle characteristics hardly occurs.

[Polyvinylidene Fluoride Resin]

The adhesive porous layer contains, as the polyvinylidene fluoride resin (PVdF resin), (1) resin A (resin A1 or resin A2), and (2) resin B.

The adhesive porous layer may further include a PVdF resin other than resin A or resin B, may include a resin other than PVdF resin, or may include an additive such as an inorganic filler, to the extent of not impairing the effects of the invention.

As described above, the resin A1 is a homopolymer (VdF resin) of vinylidene fluoride containing only structural units derived from vinylidene fluoride (VdF).

The resin A2 is a VdF-HFP resin containing structural units derived from vinylidene fluoride (VdF) and structural units derived from hexafluoropropylene (HFP), in which the ratio of structural units derived from HFP to all structural units is 1.5 mol % or less. Since the resin A2 is a copolymer, the ratio of structural units derived from HFP to all structural units of the resin A2 is greater than 0 mol % but 1.5 mol % or less.

It is preferable that the ratio of structural units derived from HFP to all structural units of the resin A2 is from 0.5 mol % to 1.0 mol %. When the ratio of structural units derived from hexafluoropropylene is within this range, a fine porous structure is easily developed and the cycle characteristics and load characteristics of a battery are more excellent.

The resin B contains structural units derived from vinylidene fluoride (VdF) and structural units derived from hexafluoropropylene (HFP), in which the ratio of structural units derived from HFP to all structural units is greater than 1.5 mol %. The resin B is also a VdF-HFP resin, like the resin A2. Note that, in the resin B, it is preferable that the ratio of structural units derived from HFP to all structural units is less than 50 mol %.

In the resin B, the ratio of structural units derived from HFP to all structural units is more preferably 15 mol % or less, and still more preferably 10 mol % or less. When the ratio of structural units derived from HFP is within this range, the porosity and average pore size are prevented from becoming too large.

As described above, the adhesive porous layer according to the invention contains (1) a resin that does not include a structural unit derived from HFP or, even if including, a resin that has a low HFP ratio, being in the region of 1.5 mol % or less (resin A1 or resin A2), and (2) resin B having a high HFP ratio such that the structural units derived from HFP is contained in a ratio of greater than 1.5 mol %.

It is preferable that the mass ratio of the resin A1 or resin A2, and the resin B, which are incorporated in the adhesive porous layer, is as follows.

It is preferable that the mass ratio [resin A:resin B] of the resin A and the resin B, which are incorporated in the adhesive porous layer, is from 15:85 to 85:15. That is, it is preferable that the ratio of resin A to the total amount of resin A and resin B is from 15% by mass to 85% by mass (the ratio of resin B is from 15% by mass to 85% by mass).

When the ratio of resin A is 15% by mass or more, a suitable surface morphology is easily obtained, and a sufficient adhesion between the separator and electrodes is easily obtained. When the ratio of resin B is 15% by mass or more, the swelling property of the polyvinylidene fluoride resin with respect to an electrolyte is less likely to be lowered, and a sufficient adhesion between the separator and electrodes is easily obtained.

The mass ratio (resin A:resin B) of the resin A and the resin B, which are incorporated in the adhesive porous layer, is more preferably from 25:75 to 75:25, and still more preferably from 35:65 to 65:35.

In the invention, it is preferable that the weight average molecular weight (Mw) of the polyvinylidene fluoride resin (resin A and resin B) is in a range of from 200,000 to 3,000,000. When the weight average molecular weight of the polyvinylidene fluoride resin is 200,000 or more, it is easy for the adhesive porous layer to obtain a mechanical strength enough to withstand heat pressing, that is the process of bonding the separator and electrodes to each other. Further, when the weight average molecular weight of the polyvinylidene fluoride resin is less than 3,000,000, in a case in which the adhesive porous layer is formed using a coating liquid for forming an adhesive porous layer, which contains the polyvinylidene fluoride resin, thickening of the coating liquid is prevented, and thus the adhesive porous layer is likely to be formed.

The adhesive porous layer may contain an additional resin other than the polyvinylidene fluoride resin (resin A and resin B).

Examples of the additional resin include copolymers (polyvinylidene fluoride copolymers) consisting of vinylidene fluoride and other monomer capable of copolymerization (tetrafluoroethylene, trifluoroethylene, trichloroethylene, vinyl fluoride, or the like); styrene-butadiene copolymers; homopolymers or copolymers of vinylnitriles such as acrylonitrile or methacrylonitrile; polyethers such as polyethylene oxide or polypropylene oxide; and the like.

Polyvinylidene fluoride resin having a relatively high molecular weight as described above can be obtained preferably by emulsion polymerization or suspension polymerization, and particularly preferably by suspension polymerization. Further, it is possible to select a commercially available resin that satisfies the copolymerization ratio of the resin A or resin B.

Further, the adhesive porous layer may contain a filler formed from an inorganic substance or an organic substance, or other additives, for the purpose of improving the slipping property or heat resistance of the separator, as long as the effects of the invention are not impaired. In this case, it is preferable that the content or particle size of the filler or additive is adjusted to a degree that does not inhibit the effects of the invention.

As the inorganic filler, the metal oxide, metal hydroxide, or the like, which are exemplified in the explanation of a functional layer capable of being stacked on a porous sheet, can be used. As the organic filler, for example, an acrylic resin or the like can be used.

[Physical Properties of Separator for a Non-aqueous Secondary Battery]

The separator for a non-aqueous secondary battery of the invention includes a porous substrate and, on at least one side of the porous substrate, an adhesive porous layer that contains a polyvinylidene fluoride resin and has a specific porosity and average pore size.

Here, since the adhesive porous layer is an adhesive layer that adheres to an electrode by heat pressing in a state of being impregnated with an electrolyte, it is necessary that the adhesive porous layer exists as the outermost layer of the separator. From the viewpoint of cycle life of a non-aqueous secondary battery, it is preferable that the separator is bonded to both the positive electrode and the negative electrode. Therefore, it is preferable that the adhesive porous layer is provided on both sides of the porous substrate.

From the viewpoint of obtaining sufficient battery performance, it is preferable that the Gurley value (JIS P8117) of the separator of the invention is from 50 sec/100 cc to 800 sec/100 cc.

In the invention, from the viewpoint of ion permeability, it is preferable that the adhesive porous layer has a sufficiently multipored structure. Specifically, the value obtained by subtracting the Gurley value of the porous substrate from the Gurley value of the separator provided with an adhesive porous layer is preferably 300 sec/100 cc or less, more preferably 150 sec/100 cc or less, and still more preferably 100 sec/100 cc or less. When this difference is 300 sec/100 cc or less, the adhesive porous layer hardly becomes excessively dense and the ion permeability is less likely to be inhibited, whereby sufficient battery characteristics are easily obtained.

From the viewpoints of mechanical strength and the energy density when prepared as a battery, the film thickness of the whole separator of the invention is preferably from 5 μm to 35 μm, and more preferably from 10 μm to 20 μm.

From the viewpoint of load characteristics of a battery, it is preferable that the membrane resistance of the separator of the invention is from 1 ohm·cm$^2$ to 10 ohm·cm$^2$. The term "membrane resistance" used herein refers to the resistance value of a separator when impregnated with an electrolyte, and is measured by an alternating current method. Naturally, the value varies depending on the kind of electrolyte, or the temperature, and the above numerical value is a numerical value measured at 20° C., using 1M LiBF$_4$-propylene carbonate/ethylene carbonate (mass ratio 1/1) as an electrolyte.

It is preferable that the thermal shrinkage percentage of the separator of the invention at 105° C. and 30 minutes is 10% or less in both MD direction and TD direction. When the thermal shrinkage percentage is within this range, the shape stability and shut down characteristics of the separator are well balanced. The thermal shrinkage percentage is more preferably 5% or less.

[Method for Producing Separator for Non-aqueous Secondary Battery]

The separator for a non-aqueous secondary battery of the invention can be produced by a method in which a coating liquid containing a polyvinylidene fluoride resin is coated on a porous substrate to form a coated layer, and subsequently, the resin in the coated layer is solidified to form an adhesive porous layer on the porous substrate in such a manner that the adhesive porous layer and the porous substrate are integrated.

Specifically, first, a polyvinylidene fluoride resin is dissolved in a solvent to prepare a coating liquid. This coating liquid is coated on a porous substrate, followed by immersion in an appropriate coagulation liquid. Thereby, the polyvinylidene fluoride resin is solidified, while inducing a phase separation phenomenon. In this process, the layer formed by using the polyvinylidene fluoride resin has a porous structure. Thereafter, the porous substrate is washed with water to remove the coagulation liquid, followed by drying. In this way, an adhesive porous layer can be formed on the porous substrate in such a manner that the adhesive porous layer and the porous substrate are integrated.

As the solvent for the coating liquid, a good solvent that dissolves the polyvinylidene fluoride resin can be used.

Preferable examples of such a good solvent, which may be used, include polar amide solvents such as N-methylpyrrolidone, dimethylacetamide, dimethylformamide, or dimethylformamide. From the viewpoint of forming a favorable porous structure in the adhesive porous layer, it is necessary to mix a phase separation agent that induces phase separation, in addition to the solvent that dissolves the polyvinylidene fluoride resin. When such a phase separation agent is not added as appropriate, it is difficult for an adhesive porous layer including a polyvinylidene fluoride resin to have a porous structure like the porous structure in the invention.

Examples of such a phase separation agent include water, methanol, ethanol, propyl alcohol, butyl alcohol, butanediol, ethylene glycol, propylene glycol, and tripropylene glycol. The phase separation agent is preferably added within a range in which viscosity suitable for coating is ensured. In a case in which a filler or other additives are added to the adhesive porous layer, the phase separation agent may be mixed or dissolved into the coating liquid.

Regarding the composition of the coating liquid, it is preferable that the polyvinylidene fluoride resin is contained in a concentration of from 3% by mass to 10% by mass. As the solvent, although it depends on the kind of solvent used, it is preferable to use a mixed solvent containing a good solvent in an amount of 60% by mass or more and a phase separation agent in an amount of from 10% by mass to 40% by mass, from the viewpoint of forming a suitable porous structure. By the amount of the phase separation agent in the mixed solvent being not too large, the pores of the porous structure are not too large, and the coating liquid is less likely to be gelled, and therefore, a coating liquid having fluidity can be provided. Further, by the amount of the phase separation agent being not too small, the adhesive porous layer is less likely to have a fingerskin structure.

In order to form a porous structure as that in the invention, it is preferable to use, as the coagulation liquid, a mixture including the above solvent, the above phase separation agent, and water. It is preferable that the mixing ratio of the solvent and the phase separation agent is determined according to the mixing ratio of the mixed solvent used for dissolving the polyvinylidene fluoride resin in view of productivity.

The concentration of water in the coagulation liquid is an important factor in controlling a porous structure. Although it depends on the kind of phase separation agent and the constitution of the coating liquid, the concentration of water is suitably from about 40% by mass to about 80% by mass with respect to the total mass of the coagulation liquid. Note that, it is preferable that the concentration of water in the coagulation liquid is not too high, in order to make it hard to form a fingerskin structure. Further, in order to prevent the pores from being less likely to be formed due to delaying of coagulation, it is preferable that the concentration of water in the coagulation liquid is not too low.

The temperature of the coagulation liquid is also one of important factors in the formation of porous structure.

In the case of the present invention, the temperature of the coagulation liquid is preferably in a range of from 20° C. to 50° C. By the temperature of the coagulation liquid being not too low, the adhesive porous layer is less likely to have a fingerskin structure, whereas by the temperature of the coagulation liquid being not too high, there is a tendency that the pores of the porous structure are less likely to become larger. In order to obtain a porous structure according to the invention, it is preferable to perform adjustment based on these tendencies.

With regard to the coating of the coating liquid on a porous substrate, a conventional coating system such as a Mayer bar, a die coater, a reverse roll coater, or a gravure coater can be applied. In a case in which the adhesive porous layer is formed at both sides of the porous substrate, the coating liquid may be coated on one side, then on the other side, and then subjected to coagulation, water washing, and drying. From the viewpoint of productivity, it is preferable that the coating liquid is coated simultaneously on both sides of the porous substrate, and then subjected to coagulation, water washing, and drying.

Moreover, the separator of the invention may also be produced by a method in which an adhesive porous layer and a porous substrate are separately produced, and then these sheets are disposed adjacently in layers and are subjected to compression bonding, heat pressing, or an adhesive, or the like to be formed into a composite. Examples of a method of obtaining an adhesive porous layer as an independent sheet include a method in which a coating liquid is coated on a release sheet, then an adhesive porous layer is formed by using the wet coating method or dry coating method described above, and then only the adhesive porous layer is peeled off

[Non-aqueous Secondary Battery]

The non-aqueous secondary battery of the invention is provided with the separator of the invention.

Specifically, the non-aqueous secondary battery of the invention includes a positive electrode, a negative electrode, and the separator for a non-aqueous secondary battery of the invention, which is disposed between the positive electrode and the negative electrode, and obtains electromotive force by doping/dedoping of lithium.

In the invention, the non-aqueous secondary battery has a structure in which a separator is disposed between a positive electrode and a negative electrode, and these battery elements are enclosed in an outer casing together with an electrolyte. As the non-aqueous secondary battery, a lithium ion secondary battery is preferable.

Note that, the term "dope" means occlusion, support, adsorption, or insertion, and means a phenomenon in which a lithium ion enters into an active substance of an electrode such as a positive electrode or the like.

The positive electrode may have a structure in which an active substance layer including a positive electrode active substance and a binder resin is formed on a current collector. The active substance layer may further include an electrically conductive additive.

Examples of the positive electrode active substance include lithium-containing transition metal oxides. Specific examples include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of the binder resin include polyvinylidene fluoride resins.

Examples of the electrically conductive additive include carbon materials such as acetylene black, KETJENBLACK, or graphite powder.

Examples of the current collector include an aluminum foil, a titanium foil, and a stainless steel foil, each having a thickness of from 5 μm to 20 μm.

In the non-aqueous electrolyte battery of the invention, in a case in which the adhesive porous layer of the separator is placed on the positive electrode side, since the polyvinylidene fluoride resin has excellent oxidation resistance, a positive electrode active substance which can be operated at a high voltage of 4.2 V or more, such as $LiMn_{1/2}Ni_{1/2}O_2$ or $LiCo_{1/3}Mn_{1/3}Ni_{1/3}O_2$, can be easily applied, which is thus advantageous.

The negative electrode may have a structure in which an active substance layer, that includes a negative electrode active substance and a binder resin, is formed on a current collector. The active substance layer may further contain an electrically conductive additive.

Examples of the negative electrode active substance include materials capable of electrochemically occluding lithium. Specific examples include carbon materials; alloys of lithium and silicon, tin, aluminium, or the like; and the like.

Examples of the binder resin include polyvinylidene fluoride resins and styrene-butadiene rubbers. Even in the case of using a styrene-butadiene rubber as the negative electrode binder, the separator of the invention can ensure sufficient adhesion to the negative electrode.

Examples of the electrically conductive additive include carbon materials such as acetylene black, KETJENBLACK, or graphite powder.

Examples of the current collector include a copper foil, a nickel foil, and a stainless steel foil, each having a thickness of from 5 μm to 20 μm.

Further, instead of using the negative electrode described above, it is possible to use a metal lithium foil as the negative electrode.

In the electrode, it is preferable that the active substance layer contains a large amount of binder resin, from the viewpoint of adhesion to a separator. Meanwhile, from the viewpoint of increasing the energy density of a battery, it is preferable that the active substance layer contains a large amount of active substance, and it is preferable that the amount of binder resin is relatively small.

Since the separator of the invention has excellent adhesion to electrodes, it is possible to reduce the amount of binder resin that constitutes the active substance layer of the electrode and to increase the amount of active substance, so that the energy density of a battery can be increased.

The electrolyte is a solution obtained by dissolving a lithium salt in a non-aqueous solvent.

Examples of the lithium salt include $LiPF_6$, $LiBF_4$, and $LiClO_4$.

Examples of the non-aqueous solvent include cyclic carbonates such as ethylene carbonate, propylene carbonate, fluoroethylene carbonate, or difluoroethylene carbonate; chain carbonates such as dimethyl carbonate, diethyl carbonate, ethyl methyl carbonate, or a fluorine substitution product thereof; cyclic esters such as γ-butyrolactone or γ-valerolactone; and the like. These non-aqueous solvents may be used singly or in mixture.

As the electrolyte, a solution obtained by mixing cyclic carbonate and chain carbonate at a mass ratio (cyclic carbonate/chain carbonate) of from 20/80 to 40/60, and dissolving a lithium salt to give a concentration of from 0.5 M to 1.5 M in the resulting solvent is preferable.

In a separator including a conventional adhesive porous layer, there are cases in which adhesion to electrodes is hardly exhibited depending on the kind of electrolyte used. However, in the separator of the invention, favorable adhesive property can be exhibited, regardless of the kind of electrolyte, which is thus advantageous.

Examples of the outer casing material include a metal can and a pack made of aluminum laminate film. Examples of the shape of a battery include a square type, a cylindrical type, and a coin type. The separator of the invention is suitable for any shape.

Since the separator of the invention has excellent adhesion to electrodes, a space is hardly formed between the electrode and the separator, even if impact from the outside is applied or expansion and shrinkage of the electrode occurs accompanying charging and discharging. Thus, the separator of the invention is suitable for use in a soft pack battery having a pack made of aluminum laminate film as the outer casing material. Accordingly, according to the separator of the invention, a soft pack battery having high battery performance can be provided.

The non-aqueous electrolyte battery of the invention can be produced, for example, by the following method. Namely, the separator of the invention is disposed between a positive electrode and a negative electrode to prepare a laminated body. Then, this laminated body is impregnated with an electrolyte and housed in an outer casing material (for example, a pack made of aluminum laminate film). Then, the laminated body is pressed together with the outer casing material, whereby a non-aqueous secondary battery is obtained.

By the production method described above, the electrodes and the separator can be favorably adhered to each other, and thus a non-aqueous electrolyte battery having an excellent cycle life may be obtained. Since the separator of the invention has excellent adhesion to electrodes, the separator and the electrodes bond to each other even by heat pressing under mild heating conditions or pressing without heating.

Further, because of the favorable adhesion between the electrodes and the separator, a battery further having excellent safety may be obtained. Accordingly, a separator which exhibits high adhesion to electrodes even by heat pressing under mild conditions or pressing without heating has been required.

The separator of the invention can bond to electrodes by stacking the separator and the electrodes together. Therefore, in the production of a battery, the pressing described above is not an essential process. However, in order to enhance the adhesion between the electrodes and the separator, it is preferable to perform pressing. In order to further enhance the adhesion between the electrodes and the separator, it is preferable to perform pressing (heat pressing) while heating.

A system of disposing a separator between a positive electrode and a negative electrode may be a system (a so-called stack system) of layering a positive electrode, a separator, and a negative electrode, each by at least one layer, in this order, and may be a system in which a positive electrode, a separator, a negative electrode, and a separator are piled up in this order and rolled up in the direction of the length.

EXAMPLES

Hereinafter, the invention is described with reference to Examples. However, it should be construed that the invention is not limited to the following Examples.

[Composition of Polyvinylidene Fluoride Resin]

The composition of a polyvinylidene fluoride resin (the ratio of structural units derived from HFP to all structural units) was determined from NMR spectrum. The NMR spectrum was obtained by dissolving 20 mg of the polyvinylidene fluoride resin in 0.6 mL of deuterated dimethyl sulfoxide at 100° C., and measuring $^{19}$F-NMR spectrum at 100° C.

[Weight Average Molecular Weight of Polyvinylidene Fluoride Resin]

The weight average molecular weight of the polyvinylidene fluoride resin was measured as follows.

Using an GPC device "GPC-900", manufactured by JASCO Corporation, and using two columns of TSKGEL SUPER AWM-H, manufactured by Tosoh Corporation, as the columns and DMF as the solvent, the weight average molecular weight was measured as a polystyrene-equivalent molecular weight by gel permeation chromatography (GPC method) at a temperature of 40° C. and a flow rate of 10 mL/min.

[Film Thickness]

The film thickness was measured using a contact thickness meter (LITEMATIC, manufactured by Mitutoyo Corporation). The measurement was performed using a cylindrical measuring terminal having a diameter of 5 mm, with adjustment so that a load of 7 g was applied during the measurement.

[Weight Per Unit Area]

The separator was cut into a 10 cm×10 cm piece, and the mass of the piece was measured. The obtained mass was divided by the area to determine the weight per unit area.

[Average Pore Size of Adhesive Porous Layer]

By a gas adsorption method, applying the BET equation, the specific surface area ($m^2$/g) of the polyolefin microporous membrane and the specific surface area ($m^2$/g) of the separator, which was a composite membrane in which a polyolefin microporous membrane and an adhesive porous layer placed are layered one on another, were measured. These specific surface areas ($m^2$/g) were multiplied by the respective weights per unit ($g/m^2$) to calculate the pore surface areas per 1 $m^2$ of sheet. Then, the pore surface area of the polyolefin microporous membrane was subtracted from the pore surface area of the separator, to calculate the pore surface area S per 1 m² of the adhesive porous layer. Separately, the pore volume V per 1 m² of sheet was calculated from the porosity. Here, assuming that all pores were cylindrical, the average pore size (diameter) d of the adhesive porous layer was determined from the following Equation 2, using the pore surface area S and the pore volume V.

$$d = 4 \cdot V/S \qquad \text{Equation 2}$$

d: average pore size of porous layer formed from a polyvinylidene fluoride resin V: pore volume of porous layer formed from a polyvinylidene fluoride resin S: pore surface area of porous layer formed from a polyvinylidene fluoride resin This average pore size d was designated as the average pore size of the porous layer formed from a polyvinylidene fluoride resin.

[Porosity]

The porosities of the separator for a non-aqueous secondary battery and the porous substrate were determined from the following Equation 3.

$$\varepsilon = \{1 - Ws/(ds \cdot t)\} \times 100 \qquad \text{Equation 3}$$

Here, ε represents the porosity (%), Ws represents the weight per unit area (g/m²), ds represents the true density (g/cm³), and t represents the film thickness (μm).

Specifically, for example, the porosity ε (%) of a composite separator in which a polyethylene porous substrate and a porous layer formed only from a polyvinylidene fluoride resin are layered one another was calculated according to the following Equation 4.

$$\varepsilon = \{1 - (Wa/0.95 + Wb/1.78)/t)\} \times 100 \qquad \text{Equation 4}$$

Here, Wa represents the weight per unit area (g/m²) of the substrate, Wb represents the weight (g/m²) of the polyvinylidene fluoride resin, and t represents the film thickness (μm).

In the case of calculating the porosity of the porous layer formed from a polyvinylidene fluoride resin, Wa=0 (g/m²), and t represents the thickness of the porous layer formed from a polyvinylidene fluoride resin, namely, a value obtained by subtracting the film thickness of the substrate from the film thickness of the separator.

[Mass of Polyvinylidene Fluoride Resin]

The mass of the polyvinylidene fluoride resin was measured from the intensity of the FKα spectrum, using an energy dispersion fluorescent X-ray analyzer (EDX-800HS, manufactured by Shimadzu Corporation). In this measurement, the mass of the polyvinylidene fluoride resin on the X-ray irradiated side is measured. Accordingly, in a case in which a porous layer formed from a polyvinylidene fluoride resin is formed on both front and back sides, the front and back are each subjected to the measurement to measure the masses of polyvinylidene fluoride resin on the front and back, and the measured values are summed to determine the front back total mass.

[Gurley Value]

The Gurley value was measured in accordance with JIS P8117, using a Gurley densometer (G-B2C, manufactured by Toyo Seiki Co., Ltd.).

[Peel Force]

A tape (SCOTCH (registered trademark) MENDING TAPE 810, manufactured by 3M) was attached on both surfaces of the separator, and the separator was cut to a size of 10 mm×200 mm to obtain a test piece. In one of the edge portions in the longitudinal direction of this test piece, the edge portions of the tapes on both surfaces were each pealed off, and the edge portions of the two tapes that had been peeled off were held by a tensile tester (TENSILON UNIVERSAL TESTER RTC-1210A, manufactured by Orientec Co., Ltd.). Then, a peeling test was carried out under the following conditions. Namely, the tensile direction was the direction perpendicular to the surface of the test piece, and the tensile speed was 20 mm/min. The average of the stress values at 30 mm to 100 mm (the values obtained by continuously measuring during peeling from 30 mm to 100 mm from the initiation of tensile) was designated as the peel force (N/cm).

[Thermal Shrinkage Percentage]

The separator was cut to a size of 18 cm (MD direction)×6 cm (TD direction) to obtain a test piece. In an oven at 105° C., the test piece was hanged such that the MD direction corresponded to the gravity direction, and subjected to a heat treatment for 30 minutes without applying tension. After the heat treatment, the test piece was taken out from the oven, and with regard to each of the MD direction and the TD direction, the thermal shrinkage percentage (%) was calculated according to the following equation.

Thermal shrinkage percentage (%)=(Length of test piece before heat treatment−Length of test piece after heat treatment)/(Length of test piece before heat treatment)×100

[Slit Edge Face]

The separator was conveyed at a conveyance speed of 40 m/min, a take-out tension of 0.3 N/cm, and a take-up tension of 0.1 N/cm, and during the conveyance, the separator was subjected to a slit treatment using a shear cutter. Thereafter, the external appearance of the edge face (slit edge face) was visually observed, and evaluated according to the following evaluation criteria.

<Evaluation Criteria>

A: The dislocation of the edge face position is 0.5 mm or less.

B: The dislocation of the edge face position is more than 0.5 mm but 2 mm or less.

C: The dislocation of the edge face position is more than 2 mm but 5 mm or less.

D: The dislocation of the edge face position is more than 5 mm.

Example 1

As the polyvinylidene fluoride resin A, a polyvinylidene fluoride (VdF resin; resin A1, weight average molecular weight of 350,000) was used.

As the polyvinylidene fluoride resin B (VdF-HFP resin), a vinylidene fluoride/hexafluoropropylene copolymer (95.2/4.8 mol %, weight average molecular weight of 270,000) was used.

A mixture obtained by mixing the resin A and the resin B at a ratio of resin A/resin B=60/40 (mass ratio) was used. The mixed resin of resin A and resin B was dissolved in a mixed solvent of dimethylacetamide/tripropylene glycol=7/3 in terms of mass ratio, such that the concentration of the mixed resin was 5% by mass, thereby preparing a coating liquid.

Equal amounts of the resulting coating liquid were coated respectively on both sides of a polyethylene microporous membrane having a film thickness of 9 μm, a Gurley value of 160 sec/100 cc, and a porosity of 43%. Subsequently, the polyethylene microporous membrane was immersed in a coagulation liquid (at 40° C.) of water/dimethylacetamide/ tripropylene glycol=57/30/13 (mass ratio), to solidify the VdF resin and the VdF-HFP resin. The resulting polyolefin microporous membrane was washed with water, followed by drying, to obtain a separator for a non-aqueous secondary battery according to the invention, which has an adhesive porous layer formed on a polyolefin microporous membrane.

With regard to this separator, the measurement results of ratio of structural units derived from hexafluoropropylene (HFP) to all structural units in each of the resin A and resin B that constitute the adhesive porous layer, mixing ratio of the both resins [column: "Mass Ratio of PVdF Resins A and B"], film thickness and weight per unit area of the separator, average pore size of the adhesive porous layer, porosities of the separator and the adhesive porous layer, mass [total mass on both sides, and ratio of the difference between the mass on the front side and the mass on the back side relative to the total mass on both sides (column: "Front Back Difference")] of the adhesive porous layer (VdF resin and VdF-HFP resin), and Gurley value of the separator are shown in Table 1. Also, with regard to the separators of Examples and Comparative Examples shown below, the results are summarized in Table 1. Further, the measurement results of peel force and thermal shrinkage percentage of the separator, and the observation results on slit edge face of the separator are shown in Table 2.

Example 2

A separator for a non-aqueous secondary battery according to the invention was obtained in a manner similar to that in Example 1, except that a mixture obtained by mixing the resins A and B at a mass ratio of resin A/resin B=80/20 was used as the polyvinylidene fluoride resin.

Example 3

A separator for a non-aqueous secondary battery according to the invention was obtained in a manner similar to that in Example 1, except that a mixture obtained by mixing the resins A and B at a mass ratio of resin A/resin B=40/60 was used as the polyvinylidene fluoride resin.

Example 4

A separator for a non-aqueous secondary battery according to the invention was obtained in a manner similar to that in Example 1, except that, instead of using the polyvinylidene fluoride resin A (resin A1, VdF resin), a vinylidene fluoride/hexafluoropropylene (99/1 mol %, weight average molecular weight of 350,000) was used as the polyvinylidene fluoride resin A corresponding to resin A2 (VdF-HFP resin), and a mixture obtained by mixing the above resins A and B at a mass ratio of resin A/resin B=75/25 was used.

Example 5

A separator for a non-aqueous secondary battery according to the invention was obtained in a manner similar to that in Example 1, except that a mixture obtained by mixing the resins A and B at a mass ratio of resin A/resin B=95/5 was used as the polyvinylidene fluoride resin.

Example 6

A separator for a non-aqueous secondary battery according to the invention was obtained in a manner similar to that in Example 1, except that a mixture obtained by mixing the resins A and B at a mass ratio of resin A/resin B=20/80 was used as the polyvinylidene fluoride resin.

Example 7

A separator for a non-aqueous secondary battery according to the invention was obtained in a manner similar to that in Example 1, except that a mixture obtained by mixing the resins A and B at a mass ratio of resin A/resin B=60/40 was used as the polyvinylidene fluoride resin.

Comparative Example 1

A separator for a non-aqueous secondary battery was obtained in a manner similar to that in Example 1, except that a mixture obtained by mixing the resins A (resin A1) and B at a mass ratio of resin A/resin B=10/90 was used as the polyvinylidene fluoride resin.

Comparative Example 2

A mixture obtained by mixing the resins A (resin A1) and B at a ratio of resin A/resin B=60/40 (mass ratio) was used as the polyvinylidene fluoride resin. The mixed resin of resin A and resin B was dissolved in 1-methyl-2-pyrrolidone to give a concentration of resin of 5% by mass, thereby preparing a coating liquid. Equal amounts of the resulting coating liquid were coated respectively on both sides of a polyethylene microporous membrane having a film thickness of 9 μm, a Gurley value of 160 sec/100 cc, and a porosity of 43%. Subsequently, the polyethylene microporous membrane was immersed in a coagulation liquid (at 25° C.) consisting of methanol, to solidify the resin A and the resin B. The resulting polyolefin microporous membrane was washed with water, followed by drying, to obtain a separator for a non-aqueous secondary battery having an adhesive porous layer formed on a polyolefin microporous membrane. The surface of this separator was observed by using a scanning electron microscope. As a result, pores having a size of approximately 258 nm, that is the calculated average pore size, were hardly confirmed, but pores having a size of approximately 10 nm were confirmed, so that it was revealed that the surface structure was dense.

Comparative Example 3

A mixture obtained by mixing the resins A (resin A1) and B at a ratio of resin A/resin B=60/40 (mass ratio) was used as the polyvinylidene fluoride resin. The mixed resin of resin A and resin B was dissolved in acetone to give a concentration of resin of 5% by mass, thereby preparing a coating liquid. Equal amounts of the resulting coating liquid were coated respectively on both sides of a polyethylene microporous membrane having a film thickness of 9 μm, a Gurley value of 160 sec/100 cc, and a porosity of 43%. Subsequently, the polyethylene microporous membrane was dried, to obtain a separator for a non-aqueous secondary battery having an adhesive porous layer formed on a polyolefin microporous membrane.

Comparative Example 4

A separator for a non-aqueous secondary battery having an adhesive porous layer formed on a polyolefin microporous membrane was obtained in a manner similar to that in Example 1, except that the temperature of the coagulation liquid was changed to 0° C.

Comparative Example 5

A separator for a non-aqueous secondary battery having an adhesive porous layer formed on a polyolefin microporous membrane was obtained in a manner similar to that in Example 1, except that, in the preparation of the coating liquid, the mixed resin of resin A and resin B was dissolved in the solvent to give a concentration of resin of 3% by mass, and the temperature of the coagulation liquid was changed to 70° C.

Comparative Example 6

As the polyvinylidene fluoride resin A2 for comparison, a polyvinylidene fluoride resin with vinylidene fluoride/hexafluoropropylene=98.0 mol %/2.0 mol %, such that the ratio of structural units derived HFP in the resin of greater than 1.5 mol %, was prepared by suspension polymerization. A separator for a non-aqueous secondary battery was obtained in a manner similar to that in Example 1, except that the resulting polyvinylidene fluoride resin for comparison was used, instead of using the polyvinylidene fluoride resin A in Example 1.

Comparative Example 7

A separator for a non-aqueous secondary battery having an adhesive porous layer formed on a polyolefin microporous membrane was obtained in a manner similar to that in Example 1, except that, in Example 1, the polyvinylidene fluoride resin B (VdF-HFP resin) was not used, and only the polyvinylidene fluoride resin A (resin A1, VdF resin) was used.

Comparative Example 8

A separator for a non-aqueous secondary battery having an adhesive porous layer formed on a polyolefin microporous membrane was obtained in a manner similar to that in Example 1, except that, in Example 1, the polyvinylidene fluoride resin A (resin A1, VdF resin) was not used, and only the polyvinylidene fluoride resin B (VdF-HFP resin) was used.

Comparative Example 9

A separator for a non-aqueous secondary battery according to the invention was obtained in a manner similar to that in Example 1, except that a mixture obtained by mixing the resins A and B at a mass ratio of resin A/resin B=97/3 was used as the polyvinylidene fluoride resin.

Comparative Example 10

A separator for a non-aqueous secondary battery according to the invention was obtained in a manner similar to that in Example 1, except that a mixture obtained by mixing the resins A and B at a quantity ratio of resin A/resin B=10/90 was used as the polyvinylidene fluoride resin.

Comparative Example 11

A separator for a non-aqueous secondary battery having an adhesive porous layer formed on a polyolefin microporous membrane was obtained in a manner similar to that in Example 1, except that the temperature of the coagulation liquid was changed to 15° C.

With regard to the respective separators of Example 1 to Example 7 and Comparative Example 1 to Comparative Example 11, the moisture was vaporized at 120° C. using a vaporizer (model VA-100, manufactured by Mitsubishi Chemical Analytech Co., Ltd.) and thereafter, the moisture content was measured using a Karl Fischer moisture meter (CA-100, manufactured by Mitsubishi Chemical Co., Ltd.). As a result, it was revealed that the moisture contents of the separators of Example 1 to Example 7 and Comparative Example 1 to Comparative Example 11 were each 1,000 ppm or less.

TABLE 1

| | Ratio of HFP Structural Units in PVdF Resin (mol %) | | Mass Ratio of PVdF Resins A and B | | Film Thickness (μm) | Weight per Unit Area (g/m²) | Average Pore Size of Porous Layer (nm) | Porosity (%) | | Mass of PVdF Resins A and B (g/m²) | | | Gurley Value (sec/100 cc) |
|---|---|---|---|---|---|---|---|---|---|---|---|---|---|
| | Resin A | Resin B | Resin A | Resin B | | | | Separator | Porous Layer | Total | Front Back Difference | | |
| Example 1 | 0 | 4.8 | 60 | 40 | 12 | 7.63 | 48 | 43 | 49 | 2.35 | 0% | 203 |
| Example 2 | 0 | 4.8 | 80 | 20 | 12 | 7.66 | 36 | 43 | 50 | 2.38 | 0% | 213 |
| Example 3 | 0 | 4.8 | 40 | 60 | 12 | 7.61 | 65 | 43 | 52 | 2.33 | 0% | 205 |
| Example 4 | 1 | 4.8 | 75 | 25 | 12 | 7.63 | 48 | 43 | 49 | 2.35 | 0% | 205 |
| Example 5 | 0 | 4.8 | 95 | 5 | 12 | 7.63 | 20 | 43 | 49 | 2.35 | 0% | 230 |
| Example 6 | 1 | 4.8 | 20 | 80 | 12 | 7.63 | 100 | 43 | 49 | 2.35 | 0% | 198 |
| Example 7 | 0 | 4.8 | 60 | 40 | 12 | 8.02 | 48 | 43 | 30 | 2.74 | 0% | 245 |
| Comparative Example 1 | 0 | 4.8 | 10 | 90 | 14 | 7.29 | 583 | 52 | 77 | 2.01 | 0% | 202 |
| Comparative Example 2 | 0 | 4.8 | 60 | 40 | 13 | 7.41 | 258 | 48 | 70 | 2.13 | 0% | 259 |
| Comparative Example 3 | 0 | 4.8 | 60 | 40 | 10 | 7.60 | unmeasurable | 33 | 0 | 2.32 | 0% | unmeasurable |
| Comparative Example 4 | 0 | 4.8 | 60 | 40 | 11 | 7.53 | 18 | 36 | 23 | 2.25 | 0% | 584 |
| Comparative Example 5 | 0 | 4.8 | 60 | 40 | 13 | 7.60 | 172 | 49 | 71 | 2.32 | 0% | 200 |
| Comparative Example 6 | 2 | 4.8 | 60 | 40 | 14 | 7.64 | 685 | 52 | 75 | 2.36 | 0% | 191 |

TABLE 1-continued

| | Ratio of HFP Structural Units in PVdF Resin (mol %) | | Mass Ratio of PVdF Resins A and B | | Film Thickness (μm) | Weight per Unit Area (g/m²) | Average Pore Size of Porous Layer (nm) | Porosity (%) | | Mass of PVdF Resins A and B (g/m²) | | Gurley Value (sec/100 cc) |
|---|---|---|---|---|---|---|---|---|---|---|---|---|
| | Resin A | Resin B | Resin A | Resin B | | | | Separator | Porous Layer | Total | Front Back Difference | |
| Comparative Example 7 | 0 | — | 100 | 0 | 16 | 7.79 | 1231 | 56 | 79 | 2.51 | 0% | 196 |
| Comparative Example 8 | — | 4.8 | 0 | 100 | 11 | 7.80 | 18 | 36 | 25 | 2.52 | 0% | 586 |
| Comparative Example 9 | 0 | 4.8 | 97 | 3 | 12 | 7.63 | 18 | 43 | 49 | 2.35 | 0% | 295 |
| Comparative Example 10 | 0 | 4.8 | 10 | 90 | 12 | 7.63 | 110 | 43 | 49 | 2.35 | 0% | 195 |
| Comparative Example 11 | 0 | 4.8 | 60 | 40 | 12 | 7.63 | 48 | 43 | 25 | 2.35 | 0% | 280 |

[Production of Non-aqueous Secondary Battery]
(Production of Negative Electrode)

300 g of artificial graphite, which is a negative electrode active substance, 7.5 g of a water-soluble dispersion including a modified product of a styrene-butadiene copolymer, which is a binder, in an amount of 40% by mass, 3 g of carboxymethylcellulose, which is a thickener, and an appropriate amount of water were stirred using a double-arm mixer, thereby obtaining a slurry for a negative electrode. This slurry for a negative electrode was coated on a copper foil having a thickness of 10 μm, which is a negative electrode current collector, and the resulting coated membrane was dried, followed by pressing, to produce a negative electrode having a negative electrode active substance layer.

(Production of Positive Electrode)

89.5 g of lithium cobalt oxide powder, which is a positive electrode active substance, 4.5 g of acetylene black, which is an electrically conductive additive, and polyvinylidene fluoride, which is a binder, were dissolved in NMP such that the amount of the polivinylidene fluoride was 6% by mass, and the obtained solution was stirred using a double-arm mixer such that the weight of the polyvinylidene fluoride was 6% by mass, thereby obtaining a slurry for a positive electrode. This slurry for a positive electrode was coated on an aluminum foil having a thickness of 20 μm, which is a positive electrode current collector, and the resulting coated membrane was dried, followed by pressing, to produce a positive electrode having a positive electrode active substance layer.

(Production of Battery)

To each of the positive electrode and negative electrode produced as described above, a lead tab was welded. Then, the positive and negative electrodes were joined together via the separator produced in Examples and Comparative Examples described above, impregnated with an electrolyte, and enclosed in an aluminum pack using a vacuum sealer. Here, 1 M $LiPF_6$ ethylene carbonate/ethyl methyl carbonate (=3/7 weight ratio) was used as the electrolyte. This aluminum pack was subjected to heat pressing using a heat press machine at 90° C. for 2 minutes, while applying a load of 20 kg per 1 cm² of electrode. In this way, a test battery was produced.

[Measurement of Resistance of Separator Impregnated with Electrolyte]

Using 1 M $LiBF_4$ propylene carbonate/ethylene carbonate=1/1, in terms of mass ratio, as an electrolyte, the separators that had been produced in the above Examples and Comparative Examples were impregnated with this electrolyte. The resulting separator was sandwiched between aluminum foil electrodes each having a lead tab attached, and then enclosed in an aluminum pack, to produce a test cell. The resistance of this test cell was measured in accordance with an alternating current impedance method (measuring frequency: 100 kHz) at 20° C. The results are summarized in Table 2.

[Test of Adhesion to Electrode]

With regard to the non-aqueous secondary batteries produced as described above, the battery after heat pressing was disassembled, and the peel strength was measured, whereby the adhesive property was evaluated. The results are summarized in Table 2. Note that, in Table 2, taking the average value of peel strengths with respect to the positive electrode and the negative electrode for the separator of Example 1 as 100, the values obtained by relatively evaluating the average value of peel strengths with respect to the positive electrode and the negative electrode for each separator are shown.

[Battery Cycle Test]

With regard to the non-aqueous secondary batteries produced as described above, a cycle test was carried out at 25° C. and at 60° C. The charge condition was constant-current constant-voltage charge at 1 C and 4.2 V, and the discharge condition was constant-current discharge at 1 C and 2.75 V cut-off. Here, the capacity retention ratio after 100 cycles was used as an index of cycle characteristics. The results are summarized in Table 2.

[Load Characteristic Test of Battery]

With regard to the non-aqueous secondary batteries produced as described above, the relative discharge capacity at 2 C, with respect to the discharge capacity at 0.2 C, was measured at 25° C. The results are summarized in Table 2. Note that, the result of the battery load characteristic test may also be used as an index of ion permeability after adhesion.

[Battery High-Temperature Storage Test]

The battery produced as described above was charged to 4.2 V. This battery was stored at 80° C. for 4 days, and the amount of gas generated was measured from the change in volume of the battery before and after storage. Relative values, when the amount of gas generated in the battery of Example 4 is taken as 100, are shown in Table 2.

[Low Temperature Characteristic]

The battery produced as described above was charged to 4.2 V, and the discharge capacity was measured by carrying out constant-current discharge at 0.2 C and 2.75 V cut-off. The discharge capacity was measured at 25° C. and at 0° C., and the ratio of the discharge capacity at 0° C. relative to the discharge capacity at 25° C. was used as an index of low temperature characteristics. The results are shown in Table 2.

TABLE 2

| | Resistance Value (ohm·cm²) | Adhesion to Electrode | Cycle Characteristic (%) 25° C. | Cycle Characteristic (%) 60° C. | Load Characteristic (%) | Storage Test (80° C., 4 days) | Low Temperature Characteristic (%) | Peel Force (N/cm) | Thermal Shrinkage Percentage [MD/TD] (%) | Slit Edge Face |
|---|---|---|---|---|---|---|---|---|---|---|
| Example 1 | 3.03 | 195 | 97 | 95 | 96 | 100 | 73 | 0.18 | 5/2 | A |
| Example 2 | 3.08 | 193 | 95 | 94 | 95 | 101 | 75 | 0.14 | 5/2 | A |
| Example 3 | 3.04 | 189 | 95 | 93 | 96 | 101 | 78 | 0.19 | 5/2 | A |
| Example 4 | 3.03 | 190 | 94 | 93 | 95 | 100 | 76 | 0.16 | 5/2 | A |
| Example 5 | 3.08 | 105 | 78 | 70 | 96 | 80 | 30 | 0.13 | 5/2 | A |
| Example 6 | 3.04 | 200 | 85 | 84 | 94 | 120 | 80 | 0.18 | 5/2 | B |
| Example 7 | 3.03 | 210 | 97 | 94 | 95 | 100 | 77 | 0.25 | 5/2 | A |
| Comparative Example 1 | 3.01 | 100 | 80 | 68 | 90 | 230 | 81 | 0.12 | 5/2 | C |
| Comparative Example 2 | 3.08 | 150 | 73 | 65 | 77 | 154 | 51 | 0.12 | 5/2 | B |
| Comparative Example 3 | 59.8 | 250 | 5 | 10 | 4 | 53 | 3 | 0.1 | 5/2 | D |
| Comparative Example 4 | 10.6 | 234 | 23 | 35 | 13 | 61 | 4 | 0.23 | 5/2 | B |
| Comparative Example 5 | 3.03 | 110 | 83 | 72 | 74 | 189 | 79 | 0.13 | 5/2 | C |
| Comparative Example 6 | 4.10 | 117 | 75 | 68 | 93 | 154 | 76 | 0.1 | 5/2 | D |
| Comparative Example 7 | 3.54 | 59 | 55 | 50 | 93 | 289 | 77 | 0.12 | 5/2 | D |
| Comparative Example 8 | 5.31 | 53 | 32 | 55 | 41 | 76 | 18 | 0.1 | 5/2 | B |
| Comparative Example 9 | 3.90 | 180 | 78 | 79 | 88 | 74 | 70 | 0.17 | 5/2 | B |
| Comparative Example 10 | 3.05 | 150 | 96 | 94 | 90 | 115 | 75 | 0.17 | 5/2 | C |
| Comparative Example 11 | 3.1 | 195 | 94 | 91 | 85 | 100 | 70 | 0.2 | 5/2 | B |

INDUSTRIAL APPLICABILITY

The separator for a non-aqueous secondary battery of the invention is suitable for use in a non-aqueous secondary battery. Particularly, the separator is suitable for use in a non-aqueous secondary battery having an aluminum laminate outer casing, in which conjugation to electrodes is important.

The disclosure of Japanese Patent Application No. 2011-231836 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A separator for a non-aqueous secondary battery, comprising:
   a porous substrate, and
   an adhesive porous layer that is coated on one side or both sides of the porous substrate, contains (1) the following polyvinylidene fluoride resin A and (2) the following polyvinylidene fluoride resin B, and has a porosity of from 30% to 52% and an average pore size of from 36 nm to 100 nm:
   (1) polyvinylidene fluoride resin A selected from the group consisting of vinylidene fluoride homopolymers, and vinylidene fluoride copolymers containing structural units derived from vinylidene fluoride and structural units derived from hexafluoropropylene, a total content of structural unit derived from hexafluoropropylene in each of the vinylidene fluoride copolymers being 1.5 mol % or less of a total content of structural unit in each of the vinylidene fluoride copolymers; and
   (2) polyvinylidene fluoride resin B selected from the group consisting of vinylidene fluoride copolymers containing a structural unit derived from vinylidene fluoride and a structural unit derived from hexafluoropropylene, a total content of structural unit derived from hexafluoropropylene in each of the vinylidene fluoride copolymers being greater than 1.5 mol % of a total content of structural unit in each of the vinylidene fluoride copolymers,
   wherein, in the adhesive porous layer, a content of the polyvinylidene fluoride resin A is from 15 parts by mass to 40 parts by mass, and a content of the polyvinylidene fluoride resin B from 60 parts by mass to 85 parts by mass, when a total amount of the polyvinylidene fluoride resin A and the polyvinylidene fluoride resin B is taken as 100 parts by mass.

2. The separator for a non-aqueous secondary battery according to claim 1, wherein the adhesive porous layer has an average pore size of from 36 nm to 70 nm.

3. The separator for a non-aqueous secondary battery according to claim 1, wherein an amount per unit area of the adhesive porous layer at one side of the porous substrate is from 0.5 g/m² to 1.5 g/m².

4. The separator for a non-aqueous secondary battery according to claim 1, wherein the value obtained by subtracting the Gurley value of the porous substrate from the Gurley value of the separator provided with an adhesive porous layer is 300 sec/100 cc or less.

5. The separator for a non-aqueous secondary battery according to claim 1, wherein the polyvinylidene fluoride resin A consists of structural units derived from vinylidene fluoride and structural units derived from hexafluoropropylene, and the polyvinylidene fluoride resin B consists of a structural unit derived from vinylidene fluoride and a structural unit derived from hexafluoropropylene.

6. The separator for a non-aqueous secondary battery according to claim 1, wherein
   the polyvinylidene fluoride resin A and the polyvinylidene fluoride resin B are bound together to form a porous structure by being dissolved and blended together in a state in which the polyvinylidene fluoride resin A and the polyvinylidene fluoride resin B are in a solvent.

7. A non-aqueous secondary battery comprising a positive electrode, a negative electrode, and the separator for a non-aqueous secondary battery according to claim 1, the separator being disposed between the positive electrode and the negative electrode, wherein, in the non-aqueous secondary battery, electromotive force is obtained by lithium doping/dedoping.

\* \* \* \* \*